United States Patent
Asano

(10) Patent No.: US 6,734,128 B2
(45) Date of Patent: May 11, 2004

(54) CERAMIC ENVELOPE FOR HIGH INTENSITY DISCHARGE LAMP AND METHOD FOR PRODUCING POLYCRYSTALLINE TRANSPARENT SINTERED ALUMINA BODY

(75) Inventor: Osamu Asano, Hashima (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 10/373,765

(22) Filed: Feb. 27, 2003

(65) Prior Publication Data

US 2003/0176272 A1 Sep. 18, 2003

(30) Foreign Application Priority Data

Mar. 7, 2002 (JP) .................. PCT/JP02/02114

(51) Int. Cl.$^7$ ............................ C04B 35/115
(52) U.S. Cl. ............... 501/153; 313/493; 313/636
(58) Field of Search ................. 501/127, 153; 313/480, 493, 636

(56) References Cited

U.S. PATENT DOCUMENTS 3,792,142 A * 2/1974 Kobayashi et al. ........ 264/1.21
3,905,845 A * 9/1975 Kobayashi et al. ........ 501/119
4,182,972 A * 1/1980 Kaneno et al. ............ 313/636
4,495,116 A * 1/1985 Kaneno et al. ............ 264/1.22

FOREIGN PATENT DOCUMENTS

| DE | 2042379 | 8/1970 |
| JP | B2 60-48466 | 10/1985 |
| JP | B2 61-6023 | 2/1986 |

* cited by examiner

*Primary Examiner*—David Sample
(74) *Attorney, Agent, or Firm*—Oliff & Berridge, PLC

(57) ABSTRACT

The invention provides a method for producing a polycrystalline transparent sintered alumina body suitable for use in a ceramic envelope for a high intensity discharge lamp, with optimized kinds and amounts of sintering aids. First, adding and mixing, to alumina of a purity of 99.9% or higher, MgO within a range from 0.002 to 0.010 wt. % and $La_2O_3$ within a range from 0.005 to 0.020 wt. %, in such a manner that a sum of MgO and $La_2O_3$ is 0.030 wt. % or less and that a ratio thereof satisfies a relation $0.2 \leq MgO/La_2O_3 \leq 0.5$. Next, firing a mixture at 900 to 1200° C. and cast molding the fired alumina. Then, after a chelating treatment, sintering the molded alumina for at least 1 hour at 1650 to 1900° C. in a reducing atmosphere under a normal pressure.

2 Claims, 2 Drawing Sheets

Magnification x 400

Magnification x 400

CERAMIC ENVELOPE FOR HIGH INTENSITY DISCHARGE LAMP AND METHOD FOR PRODUCING POLYCRYSTALLINE TRANSPARENT SINTERED ALUMINA BODY

BACKGROUND OF THE INVENTION

This application claims the benefit of Japanese Application Number PCT/JP02/2114 filed Mar. 7, 2002, the entirety of which is incorporated by reference.

1. Field of the Invention

The present invention relates to a ceramic envelope for a high intensity discharge lamp, to be used in a high intensity discharge lamp such as a high-pressure sodium lamp or a metal halide lamp. Further the present invention relates to a method for producing a polycrystalline transparent sintered alumina body adapted for use in such ceramic envelope. More particularly, it relates to a method for producing a polycrystalline transparent sintered alumina body adapted for use in a ceramic envelope for a high intensity discharge lamp, by optimizing kinds and amounts of sintering aids to be added to the alumina.

2. Related Background Art

A polycrystalline transparent sintered alumina body, being excellent in transparency, heat resistance and anticorrosion resistance, is widely employed in a ceramic envelope for a high intensity discharge lamp such as a high-pressure sodium lamp or a metal halide lamp.

Such polycrystalline transparent sintered alumina body is formed with an addition of a sintering aid such as MgO, $La_2O_3$ or $Y_2O_3$ in order to improve a light transmittance and a mechanical strength. An effective amount of addition of such sintering aid is described for example in Japanese Patent Kokoku Publication (JP-B) Nos. 60-48466 and 61-6023 and in German Patent No. DE 2042379.

Japanese Patent Kokoku Publication (JP-B) No.60-48466 describes additions of MgO by 0.001 to 0.1 wt. %, $La_2O_3$ by 0.001 to 0.05 wt. % and $Y_2O_3$ by 0.001 to 0.05 wt. % with a ratio $MgO/(La_2O_3+Y_2O_3)$ within a range of 0.5 to 2.0, and that such ratio enables to sinter at a low temperature and to provide an optical transmittance and a mechanical strength of an excellent level.

Also Japanese Patent Kokoku Publication (JP-B) No. 61-6023 discloses a configuration of improving an in-line transmittance by maintaining MgO at 150 ppm (0.015 wt. %) or less, and German Patent No DE 2042379 discloses a ratio of MgO within a range of 0.01 to 0.1 wt. %, $La_2O_3$ within a range of 0.05 to 0.5 wt. % and $Y_2O_3$ within a range of 0.05 to 0.5 wt. %.

However, such prior technologies have the following problems. First, when MgO is added in a large amount, it causes solid dissolution with alumina to form an oxygen lattice defect at the grain boundary. As a result, a blacking phenomenon is observed. Also, MgO has a strong hygroscopic property and moisture absorbed in the envelope is broken down into hydrogen and oxygen. Then the hydrogen induces extinction of an electric discharge arc, while the oxygen accelerates oxidation of electrodes.

On the other hand, when MgO is added in a small amount, sintering aids reduce their effectiveness. For example, crystal grains are not controlled to be out of uniformity, which lowers mechanical strength. Moreover, transparency is reduced due to a failure of complete bubble discharge in the grains.

SUMMARY OF THE INVENTION

The present invention is to provide a ceramic envelope for a high intensity discharge lamp, formed by a polycrystalline transparent sintered alumina body obtained by sintering alumina under additions of MgO within a range from 0.002 to 0.010 wt. % and $La_2O_3$ within a range from 0.005 to 0.020 wt. %, in such a manner that a sum of MgO and $La_2O_3$ is 0.030 wt. % or less and that a ratio thereof satisfies a relation $0.2 \leq MgO/La_2O_3 \leq 0.5$.

The present inventors have experimentally found optimum kinds and amounts of sintering aids adapted for use in the ceramic envelope, formed by alumina, for the high intensity discharge lamp. Addition of MgO and $La_2O_3$ is essential for controlling a size of alumina, crystal grains and a wintering temperature, and for extending the service life of the discharge lamp. However, a total amount of addition exceeding 0.030 wt. % results in a blacking of the envelope or a deterioration in the total transmittance. Also a ratio of MgO and $La_2O_3$ outside the above range results in a deterioration in the uniformity of grains or in a luminous flux maintenance (blacking of envelope). Therefore, an addition of the sintering aids in the above-mentioned condition allows to obtain a ceramic envelope excellent in uniformity of grains, total transmittance, luminous flux maintenance and durability, which enables to obtain a ceramic envelope suitable for the high intensity discharge lamp.

A method for producing a polycrystalline transparent sintered alumina body of the present invention includes the steps of: adding and mixing, to powdered alumina of a purity of 99.9% or higher, MgO within a range from 0.002 to 0.010 wt. % and $La_2O_3$ within a range from 0.005 to 0.020 wt. %, in such a manner that a sum of MgO and $La_2O_3$ is 0.030 wt. % or less and that a ratio thereof satisfies a relation $0.2 \leq MgO/La_2O_3 \leq 0.5$, firing a mixture of alumina at 900 to 1200° C., molding the pre-sintered alumina, and sintering the molded alumina in a reducing atmosphere under a normal pressure.

Such producing method allows to obtain a polycrystalline transparent sintered alumina body excellent in uniformity of grains and in transparency, by a simple sintering under the normal pressure.

DETAILED DESCRIPTION OF THE PREFERRED EMBODIMENTS

In the following there will be explained in detail a most preferred embodiment of the present invention. A polycrystalline transparent sintered alumina body of the invention is prepared by a following process.

First, alumina powder of a high purity of 99.9% or higher is prepared. Next, the following additives are added to the alumina. MgO in an amount of 0.0005 to 0.015 wt. % and $La_2O_3$ in an amount of 0.0025 to 0.025 wt. %, with a sum of MgO and $La_2O_3$ not exceeding 0.030 wt. %. After being dissolved in purified water with a normal amount of a carbonate salt or a nitrate salt, the mixture is mixed for 10 hours or longer in a ball mill.

Then, the mixture taken out from the ball mill is dried and fired for 2 to 5 hours at 900 to 1200° C. In this step, additives are converted from salts into oxides.

Next, the fired article is mixed in a ball mill with a binder and a dispersant and the like. When bubbles are eliminated, the mixture is molded by casting to obtain a ceramic envelope for a high intensity discharge lamp for example of a shape shown in FIG. 1.

Figure 1:
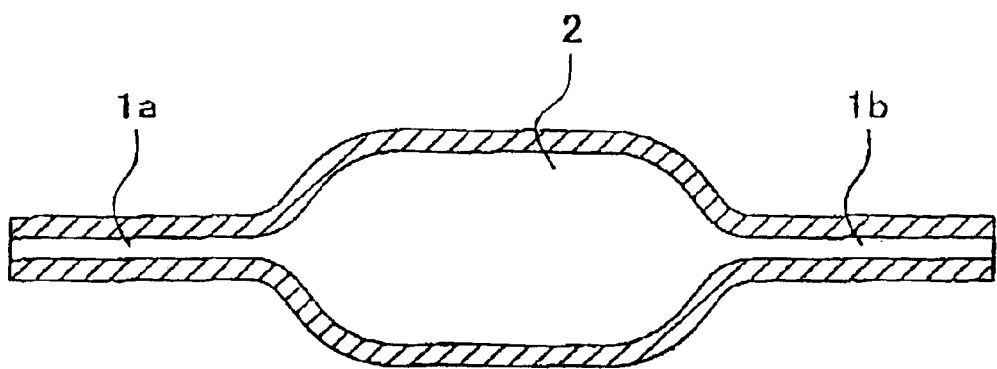
FIG. 1 is a schematic cross-sectional view of a ceramic envelope for a high intensity discharge lamp.

FIG. 1 is a schematic cross-sectional view of the ceramic envelope for the high intensity discharge lamp. The left and right end parts of the envelope with a reduced diameter constitute electrode mounting parts 1a, 1b, in which electrodes are mounted to seal the arc tube. A discharge space 2 is provided with a central part having an enlarged diameter in which a light-emitting substance such as sodium or mercury is filled.

After the molding, the second firing is executed for 1 hour or longer at 700 to 1300° C. in the air, to eliminate the binder, the dispersant and the like. As the cast molding utilizes a gypsum mold, a chelating process is executed after the second firing so that metal ion impurities are removed in the chelating process, EDTA is employed for example. Thereafter a washing with purified water is executed.

After the washing, the molded article is dried and subjected to a sintering step. The sintering is executed under a vacuum and in a reducing atmosphere such as of an ammonia decomposition gas or hydrogen, and is preferably continued for at least 1 hour at 1650 to 1900° C. The added MgO and $La_2O_3$ function as a grain size controlling agent for alumina, and $La_2O_3$ further provides an effect of lowering the sintering temperature.

Results of evaluation of thus formed polycrystalline transparent sintered alumina body are shown in Table 1.

TABLE 1

| Test No. | Added amount (wt %) MgO | Added amount (wt %) $La_2O_3$ | $MgO/La_2O_3$ ratio | Evaluation item Grain uniformity | Evaluation item Total transmittance | Evaluation item Luminous flux maintenance (tube blacking) |
|---|---|---|---|---|---|---|
| 1 | 0.0150 | 0.0150 | 1.0 | + | − | − |
| 2 | 0.0050 | 0.0250 | 0.2 | + | − | + |
| 3 | 0.0100 | 0.0200 | 0.5 | + | + | + |
| 4 | 0.0100 | 0.0150 | 0.667 | + | + | − |
| 5 | 0.0075 | 0.0150 | 0.5 | + | + | + |
| 6 | 0.0060 | 0.0130 | 0.462 | + | + | + |
| 7 | 0.0030 | 0.0150 | 0.2 | + | + | + |
| 8 | 0.0030 | 0.0120 | 0.25 | + | + | + |
| 9 | 0.0020 | 0.0120 | 0.125 | − | − | + |
| 10 | 0.0015 | 0.0100 | 0.15 | − | + | + |
| 11 | 0.0030 | 0.0050 | 0.6 | + | − | − |
| 12 | 0.0020 | 0.0050 | 0.4 | + | + | + |
| 13 | 0.0010 | 0.0050 | 0.2 | − | − | − |
| 14 | 0.0005 | 0.0025 | 0.2 | − | − | − |

In Table 1, "+" and "−" respectively indicate good and poor, which are rated according to criteria shown in Table 2.

TABLE 2

| Item | + | − |
|---|---|---|
| Grain uniformity | size relatively uniform | size uneven |
| Total transmittance | 92% or higher | less than 92% |
| Luminous flux Maintenance | 90% or higher | less than 90% |

The luminous flux maintenance indicates a rate measured in a 250 W metal halide lamp after a lighting temp for 1000 hours.

Table 1 indicates that a test No. 4 with $MgO/La_2O_3=0.667$ showed a deterioration in the luminous flux maintenance, while a test No. 11 with $MgO/La_2O_3=0.6$ showed a deterioration in the total transmittance and in the luminous flux maintenance, and tests Nos. 2, 13 and 14 with $MgO/La_2O_3=0.02$ showed a deterioration at least in the total transmittance A test No. 7 showed a good result even with $MgO/La_2O_3=0.2$, but the absolute amounts of additives were different in this case.

Based on these results, more detailed evaluations were made, of which results are shown in Table 3.

TABLE 3

| Test No. | Added amount (wt %) MgO | Added amount (wt %) $La_2O_3$ | Evaluation item Grain Uniformity | Evaluation item Total transmittance | $MgO/La_2O_3$ |
|---|---|---|---|---|---|
| 1 | 0.0050 | 0.0200 | + | + | 0.25 |
| 2 | 0.0070 | 0.0150 | ++ | ++ | 0.47 |
| 3 | 0.0050 | 0.0150 | ++ | ++ | 0.33 |
| 4 | 0.0040 | 0.0100 | ++ | ++ | 0.40 |
| 5 | 0.0025 | 0.0100 | + | ++ | 0.25 |
| 6 | 0.0025 | 0.0075 | + | + | 0.33 |

In Table 3, "++" indicates an excellent evaluation.

According to the evaluation of the grain uniformity and the total transmittance based on Tables 1 and 3, it is preferred that the ratio $MgO/La_2O_3$ is maintained within a range $0.2 \leq MgO/La_2O_3 \leq 0.5$. Moreover, within such range, additions of MgO in an amount of 0.0020 to 0.010 wt. % and $La_2O_3$ in an amount of 0.005 to 0.020 wt. % allow to obtain a ceramic envelope for a high intensity discharge lamp, excellent in the grain uniformity, the total transmittance and the luminous flux maintenance. In particular, it is most preferable for the ceramic envelope for the high intensity discharge lamp to add MgO in an amount of 0.0030 to 0.0075 wt. % and $La_2O_3$ in an amount of 0.0100 to 0.0150 wt. %, within a range $0.33 \leq MgO/La_2O_3 \leq 0.47$.

Figure 2:
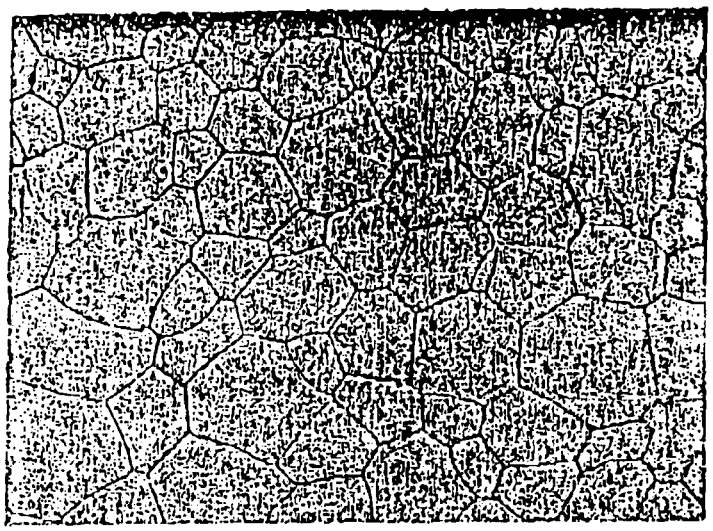
FIG. 2 is a cross-sectional photograph, replacing a drawing and magnified 400 times, of a polycrystalline transparent sintered alumina body of the present invention.
Figure 3:
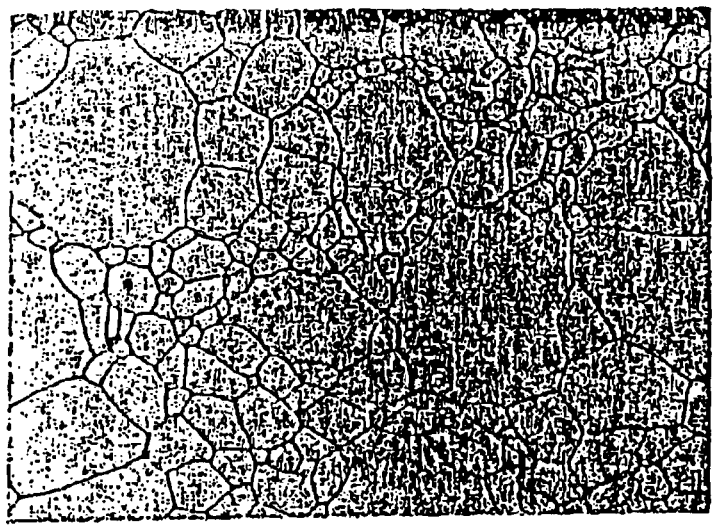
FIG. 3 is a cross-sectional photograph, replacing a drawing and magnified 400 times, of a polycrystalline transparent sintered alumina body known in the prior art.

FIG. 2 (Photo 1) is a magnified cross-sectional photograph of a polycrystalline transparent sintered alumina body of the test No. 6 in Table 1, falling within the range $0.2 \leq MgO/La_2O_3 \leq 0.5$. Also FIG. 3 (Photo 2) is a magnified cross-sectional photograph of the test No. 13, having a poor grain uniformity, shown for the purpose of comparison. Photographs in FIGS. 2 and 3 are both magnified 400 times. As shown in FIG. 2, it will be understood that the polycrystalline transparent sintered alumina body of the invention has uniform grains, a high mechanical strength and is excellent in the total transmittance.

As explained in the foregoing, by maintaining the addition amount of MgO within a range of 0.0020 to 0.010 wt. % and the addition amount of $La_2O_3$ within a range of 0.005 to 0.0120 wt. % with the sum of MgO and $La_2O_3$ at 0.030 wt. % or less and within a range $0.2 \leq MgO/La_2O_3 \leq 0.5$, it is possible to obtain a ceramic envelope for a high intensity discharge lamp excellent in the total transmittance and the luminous flux maintenance. Further, it is possible to obtain a polycrystalline transparent sintered alumina body excellent in the grain uniformity and the transparency by a sintering process under a normal pressure.

The sum of MgO and $La_2O_3$ is preferably maintained at 0.030 wt. % or less. This is why an increase in the addition of $La_2O_3$ impairs the balance with MgO thereby generating a second phase and deteriorating the transmittance, while an increase in the addition of MgO results in a blacking phenomenon.

Although the ceramic envelope is molded by cast molding in the foregoing embodiment, other methods may also be employed such as lost wax method, powder press molding method, extrusion press molding method, frozen molding method, injection molding method or gellation molding method.

What is claimed is:

1. A ceramic envelope for a high intensity discharge lamp, comprising a polycrystalline transparent sintered alumina body formed by adding, to alumina, MgO within a range of 0.002 to 0.010 wt. % and $La_2O_3$ within a range of 0.005 to 0.020 wt. % with a sum of MgO and $La_2O_3$ at 0.030 wt. % or less and within a range $0.2 \leq MgO/La_2O_3 \leq 0.5$ and sintering.

2. A method for producing a polycrystalline transparent sintered alumina body comprising the steps of:

adding and mixing, to powdered alumina of a purity of 99.9% or higher, MgO within a range from 0.002 to 0.00 wt. % and $La_2O_3$ within a range from 0.005 to 0.020 wt. %, in such a manner that a sum of MgO and $La_2O_3$ is 0.030 wt. % or less and that a ratio thereof satisfies a relation $0.2 \leq MgO/La_2O_3 \leq 0.5$;

firing the mixture at 900 to 1200° C.;

molding the fired alumina; and sintering the molded alumina in a reducing atmosphere under a normal pressure.

* * * * *